June 23, 1931.   F. H. SMITH   1,811,283

HOSE COUPLING

Filed May 7, 1928

INVENTOR.
FREDERICK HARRIS SMITH
BY A. B. Bowman
ATTORNEY

Patented June 23, 1931

1,811,283

UNITED STATES PATENT OFFICE

FREDERICK HARRIS SMITH, OF SAN DIEGO, CALIFORNIA

HOSE COUPLING

Application filed May 7, 1928. Serial No. 275,690.

My invention relates to a hose coupling, particularly to that class of couplings in which the one portion may be quickly secured to, as well as quickly detached from the other portion, and the objects of my invention are: first, to provide a coupling of this class in which the female coupling member is cut away on one side to permit the insertion of the male coupling member into the side thereof, and which members are rigidly secured together by turning one of said members relatively to the other only a portion of a revolution; second, to provide a coupling of this class in which the male and female coupling members are rigidly secured together by means of retaining portions on both of said members, engaging each other, when one of said members is turned a portion of a revolution; third, to provide a coupling of this class in which the coupling members thereof are rigidly secured together against longitudinal distortion; fourth, to provide such a coupling which will reduce to a minimum the effort and time usually required to secure a hose to a faucet, particularly if the faucet is not readily accessible or cannot be easily seen, and by which coupling means the coupling may be readily positioned in alignment with the threaded portion of the faucet; fifth, to provide a novelly constructed hose coupling, and sixth, to provide a coupling of this class which is very simple and economical of construction, durable, efficient, and which will not readily deteriorate or get out of order.

Figure 1:
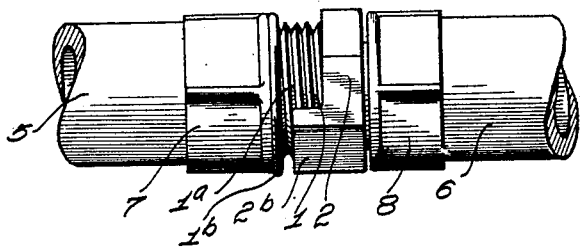
Figure 2:
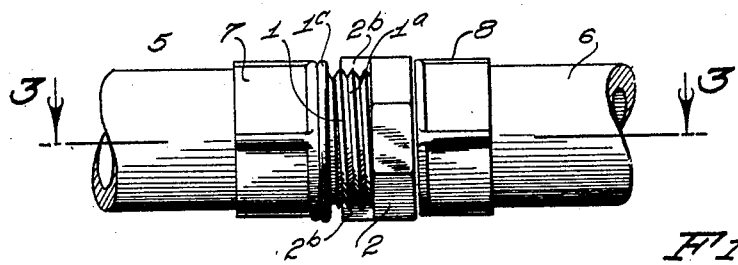
Figure 3:
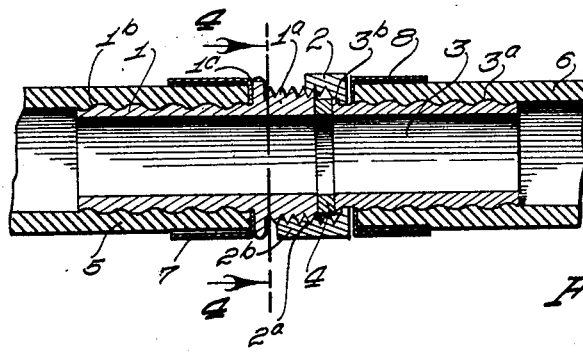
Figure 4:
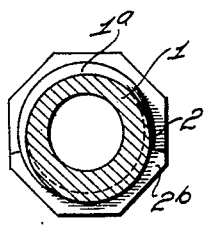

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a side view of my hose coupling secured to the ends of hose lengths adapted to be connected together; Fig. 2 is another side view thereof, taken at a right angle to that of Fig. 1; Fig. 3 is a longitudinal, sectional view thereof, taken through 3—3 of Fig. 2, and Fig. 4 is a transverse, sectional view thereof, taken through 4—4 of Fig. 3.

Like characters of reference refer to similar parts and portions throughout the several views of the drawings.

The male coupling member 1, female coupling member 2, insert member 3, washer 4, hose members 5 and 6, and the hose retaining members 7 and 8, constitute the principal parts and portions of my coupling structure.

The male coupling member 1 is hollow and is constructed similarly to the conventional coupling member of this class, being provided with external threads 1a at the outer end, a plurality of annular corrugations 1b at the other end thereof, and an annular flange 1c intermediate the threaded and the corrugated portions. The annular, corrugated portion 1b of the hollow coupling member 1 is adapted to be inserted into one end of the hose member 5, which hose is secured to the member 1 by means of an annular, contracting, retaining member 7, substantially as shown in the drawings. The insert member 3 is also hollow and provided at its one end with a plurality of annular corrugations 3a, which end is adapted to be inserted into the one end of the other hose member 6, which hose member is secured to said insert member bp means of a similar hose retaining member 8. The portion of the insert member projecting from the end of the hose member 6 is provided with an annular, outwardly extending flange 3b, which is adapted to retain the annular, female coupling member 2 in position thereon, it being noted that the coupling member 2 is revolubly mounted at the end of said insert member.

The coupling member 2 is constructed similarly to the conventional coupling member of this class, the same being provided with internal threads 2a. Said female coupling member 2, however, is cut away at its outer portion and on one side, preferably more than half of its circumference, substantially as shown in Fig. 4 of the drawings, to permit the insertion of the male coupling member therein from the side thereof, thus eliminating the necessity of rotating the annular member five or six or more revolutions for securing said coupling members together. It will be noted that by cutting away the one side of the coupling member 2 the strength of the same is not materially reduced, since the stress due to longitudinal distortion is exerted against the annular portion of the cut-away portion of the coupling member 2 and not on the thread of the same except at the extended end 2b of the coupling member 2. A rubber washer 4 is positioned between the end of the insert member 3 and the coupling member 1, as in the conventional coupling of this class.

It will be here noted that instead of the external and internal threads of the respective coupling members 1 and 2, the same may be provided with radially extending lugs on one of said members and corresponding helically shaped groove portions in the other of said coupling members, thus producing the same or a similar result.

It will also be noted that instead of the male and female coupling members being secured to the ends of hose lengths, the same may be secured to or made an integral part of a faucet or other outlet.

It is obvious from this construction, as illustrated in the drawings and described in the foregoing specification, that there is provided a hose coupling as aimed at and set forth in the objects of the invention, and though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent, is:

1. A hose coupling, including a hollow hose coupling member provided with external threads on one end thereof, and a revolubly mounted, annular hose coupling member provided with several turns of internal threads corresponding with the threads of said other member, said annular hose coupling member being provided with a longitudinally extended portion on one side thereof adapted to engage the side of said externally threaded hose coupling member and being open at the opposite side adapted to receive the extended threaded portion of the other coupling member sideways.

2. In a hose coupling, a first hollow coupling member externally threaded at its one end, a second coupling member having an internally threaded portion at its one end, and a shoulder formed at the inner end of said threaded portion, and a gasket arranged to engage said shoulder, said internally threaded portion extending axially past said gasket for receiving the externally threaded end of said first coupling member, and a semi-cylindrical projection extending axially from said threaded portion, said semi-cylindrical projection being internally threaded corresponding to said threaded portion and arranged to receive said first coupling member sidewise.

3. In a hose coupling, a support, a first hollow coupling member revolubly mounted thereon, a substantially semi-cylindrical lip protruding from said first coupling member, internal screw threads within said first coupling member and said lip, a second coupling member, external screw threads thereon, said second coupling member insertable sidewise into said lip whereupon rotation of said first coupling member draws said second coupling member into interlocking relation therewith.

4. In a hose coupling member, an insert member, an axially constricted collar rotatably mounted thereon, a semi-cylindrical lip protruding axially from said collar, internal screw threads completing several convolutions within said collar and continuing along said lip, a coupling member and external screw threads formed on said coupling member, said coupling member connectible to said collar by insertion sidewise into said lip whereupon rotation of said collar member draws said coupling into interlocking relation therewith.

In testimony whereof, I have hereunto set my hand at San Diego, California this 27th day of April 1928.

FREDERICK HARRIS SMITH.